(12) United States Patent
Plepenbrink et al.

(10) Patent No.: US 8,973,051 B2
(45) Date of Patent: *Mar. 3, 2015

(54) NAVIGATION METHOD AND SYSTEM TO PROVIDE A NAVIGATION INTERFACE

(75) Inventors: David Plepenbrink, Chicago, IL (US); Lee M. Chow, Naperville, IL (US); James T. Sofos, Aurora, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,142

(22) Filed: May 15, 2012

(65) Prior Publication Data

US 2012/0227070 A1    Sep. 6, 2012

Related U.S. Application Data

(63) Continuation of application No. 12/342,971, filed on Dec. 23, 2008, now Pat. No. 8,196,174.

(51) Int. Cl.
| | |
|---|---|
| *H04N 5/445* | (2011.01) |
| *H04N 21/443* | (2011.01) |
| *H04N 21/485* | (2011.01) |
| *H04N 5/44* | (2011.01) |

(52) U.S. Cl.
CPC ....... *H04N 5/44543* (2013.01); *H04N 5/44513* (2013.01); *H04N 21/4438* (2013.01); *H04N 21/485* (2013.01); *H04N 2005/4412* (2013.01)
USPC ............................................. 725/52; 725/37

(58) Field of Classification Search
CPC .......................... H04N 21/482; H04N 21/4858
USPC ........................................................ 725/37, 43
See application file for complete search history.

(56) References Cited

U.S. PATENT DOCUMENTS

| | | | | |
|---|---|---|---|---|
| 6,008,803 | A * | 12/1999 | Rowe et al. | 348/E5.105 |
| 6,266,098 | B1 * | 7/2001 | Cove et al. | 348/563 |
| 6,766,526 | B1 * | 7/2004 | Ellis | 725/57 |
| 7,076,734 | B2 | 7/2006 | Wolff et al. | |
| 7,561,214 | B1 * | 7/2009 | O'Callaghan | 348/731 |
| 8,196,174 | B2 * | 6/2012 | Piepenbrink et al. | 725/151 |
| 8,220,021 | B1 * | 7/2012 | Look et al. | 725/45 |
| 2001/0045965 | A1 | 11/2001 | Orbanes et al. | |
| 2003/0005452 | A1 * | 1/2003 | Rodriguez | 725/86 |
| 2003/0084449 | A1 | 5/2003 | Chane et al. | |
| 2004/0075693 | A1 | 4/2004 | Moyer et al. | |
| 2005/0131945 | A1 * | 6/2005 | Muller et al. | 707/104.1 |
| 2006/0123361 | A1 | 6/2006 | Sorin et al. | |
| 2006/0253801 | A1 | 11/2006 | Okaro et al. | |

(Continued)

*Primary Examiner* — Junior Mendoza

(74) *Attorney, Agent, or Firm* — Guntin & Gust, PLC; Joseph Hrutka

(57) ABSTRACT

A communication device includes a memory storing computer instructions and a processor coupled to the memory to execute the computer instructions to provide a graphical user interface at a display coupled to the communication device. The graphical user interface includes a visual navigation trail having a selectable category. The memory also includes instructions executable by the processor to receive a signal at the communication device indicating a selection of the selectable category. Further, the memory includes instructions executable by the processor to cause the graphical user interface to display, in response to the signal, a menu including the selectable category and a peer category related to the selectable category. The menu automatically becomes navigable via directional keys at a remote control device when the menu is displayed.

24 Claims, 9 Drawing Sheets

(56) References Cited

U.S. PATENT DOCUMENTS

| | | | |
|---|---|---|---|
| 2007/0162936 A1* | 7/2007 | Stallings et al. | 725/58 |
| 2007/0180404 A1 | 8/2007 | Gandolph et al. | |
| 2008/0244659 A1* | 10/2008 | Stallings et al. | 725/52 |
| 2008/0282289 A1 | 11/2008 | Drazin | |
| 2008/0294274 A1 | 11/2008 | Laberge et al. | |
| 2009/0282428 A1* | 11/2009 | Rodriguez | 725/9 |
| 2010/0091162 A1 | 4/2010 | Chuang et al. | |
| 2012/0089996 A1* | 4/2012 | Ramer et al. | 725/14 |

\* cited by examiner

_US 8,973,051 B2_

NAVIGATION METHOD AND SYSTEM TO PROVIDE A NAVIGATION INTERFACE

CROSS-REFERENCE TO RELATED APPLICATIONS

This application is a continuation of and claims priority to U.S. patent application Ser. No. 12/342,971 filed Dec. 23, 2008 which is incorporated herein by reference in its entirety.

FIELD OF THE DISCLOSURE

The present disclosure generally relates to communications networks, and more particularly relates to navigation methods and systems to provide a navigation interface.

BACKGROUND

Television service providers can provide a variety of content via customer premises equipment. A user may desire to select content that is to be viewed via a television. The extent of available content may cause the user to navigate through various hierarchies before finding the desired content.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed embodiments. Moreover, some statements may apply to some inventive features but not to others.

Figure 1:
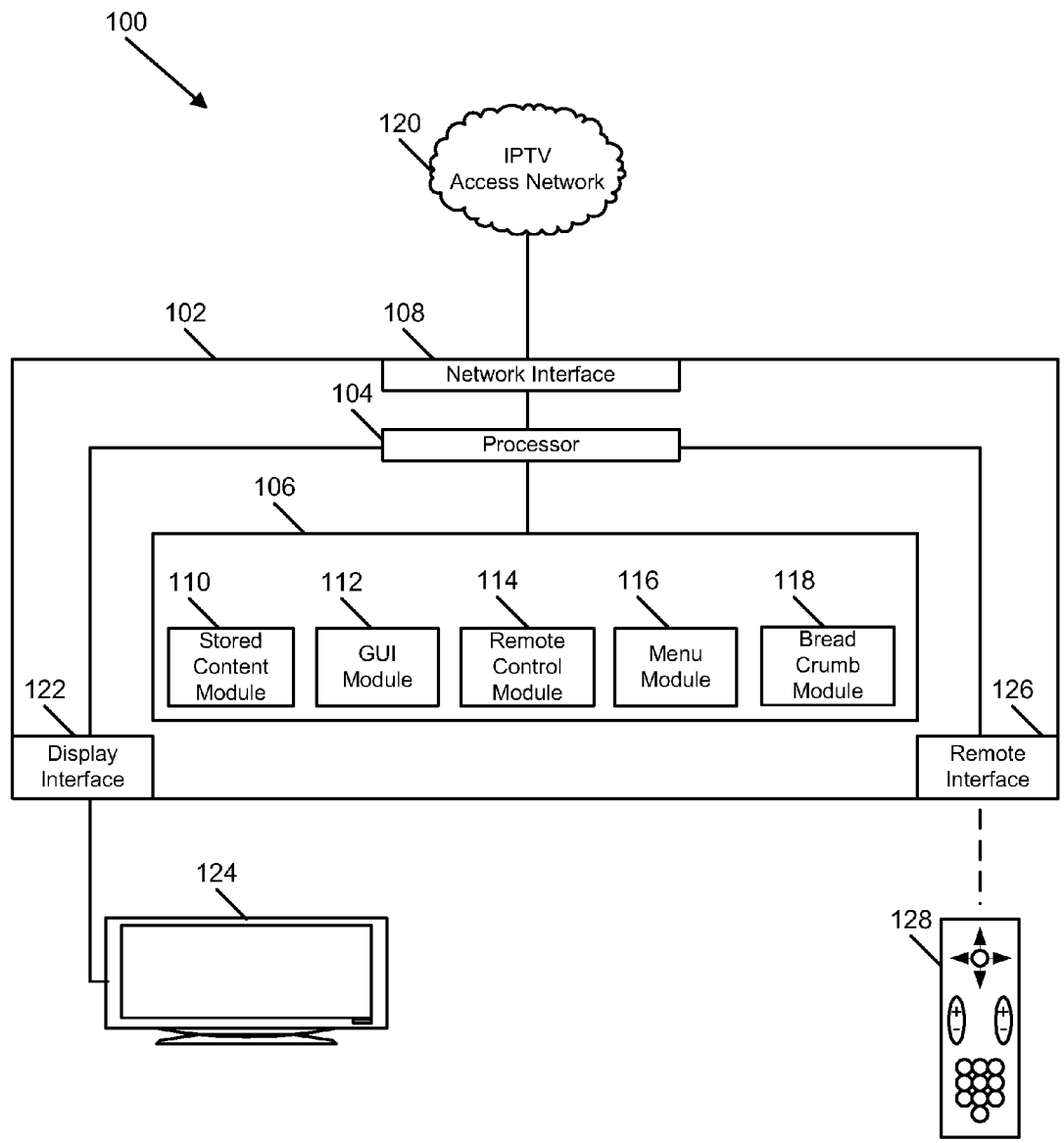
FIG. 1 is a block diagram illustrating a particular embodiment of a system to provide a navigation interface.

FIG. 1 illustrates a particular embodiment of a system 100 to provide a navigation interface. The system 100 includes a set-top box device 102 having a processor 104 and memory 106 accessible to the processor 104. The set-top box device 102 can also include a network interface 108 adapted to facilitate communication between the set-top box device 102 and a private access network, such as an Internet Protocol Television (IPTV) access network 120 or other video distribution, triple-play or quad-play network. In addition, the set-top box device 102 includes a display interface 122 adapted to facilitate communication between the set-top box device 102 and a display device coupled to the set-top box device 102, such as the television 124. Further, the set-top box device 102 includes a remote interface 126 adapted to facilitate communication between the set-top box device 102 and a remote control device associated with the set-top box device 102, the television 124, or a combination thereof.

The memory 106 includes a plurality of modules 110-118. The modules 110-118 can include computer instructions that are readable and executable by the processing logic 104 to implement various functions of the set-top box device 102 with respect to providing a navigation interface. For example, the modules 110-118 can represent various aspects of one or more software applications, operating systems, or other computer programs. In other embodiments, the modules 110-118 can be implemented as hardware logic or a combination of hardware logic and computer instructions.

For example, the memory 106 includes a stored content module 110 to store content at the set-top box device 102, such as settings information related to the set-top box device 102, the television 124, a digital video recorder (not shown), other settings information, or any combination thereof; electronic program guide information; recorded video content; recorded audio content; video game content; video game session content; other stored content; or any combination thereof.

Figure 2A:
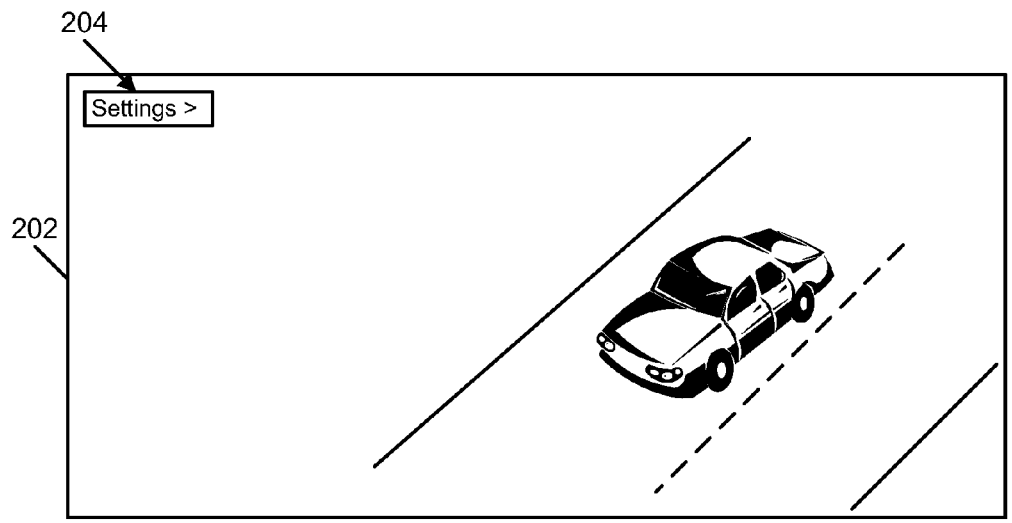
FIGS. 2A-2F illustrate aspects of an illustrative embodiment of a navigation interface.

In addition, the memory 106 includes a GUI module 112 that is executable by the processor 104 to provide, at the television 124, a graphical user interface (GUI) related to content stored at the set-top box device 102, in response to a request to interact with the stored content. In an illustrative embodiment, the GUI can include a selectable icon or text indicating an initial category. For instance, in response to a signal received from the remote control 128 indicating a selection of a "Settings" key, the GUI module 112 can be executable by the processor 104 to provide a GUI 202, as illustrated in FIG. 2A. The GUI 202 can include text referencing an initial category, such as a "Settings" category 204, which is highlighted or otherwise made active to facilitate selection by a user.

The memory 106 includes a remote control module 114 that is executable by the processor 104 to process signals received from the remote control 128. Such signals can include a signal indicating a selection of a confirmation key at the remote control 128; a signal indicating a selection of a directional key at the remote control 128; a signal indicating a selection of a functional key, such as a "Settings" or "Menu" key at the remote control 128; or a combination thereof. For example, the remote control module 114 can be executable by the processor 104 to process a signal indicating a selection of a confirmation key at the remote control 128, such as an "OK" key, an "Enter" key, a "Select" key, or another confirmation key, while the "Settings" category 204 is highlighted or otherwise active within the GUI 202 illustrated in FIG. 2A.

The memory 106 includes a menu module 116 that is executable by the processor 104 to cause the GUI to display, in response to the signal indicating selection of the initial category, a menu having selectable peer subcategories that are each children of the initial category. For instance, the menu module 116 can be executable by the processor 104 to cause the GUI 202 to display a menu 208, as illustrated in FIG. 2B, that includes selectable subcategories of the "Settings" category 204, such as audio settings, video settings, input settings, channel settings, time settings, DVR settings, other settings subcategories, or any combination thereof.

In addition, the menu module 116 is executable by the processor 104 to determine, in response to a signal received from the remote control 128 indicating a selection of a subcategory in a menu, whether the selected subcategory is associated with one or more additional subcategories that are children of the selected subcategory. If the selected subcategory is associated with one or more additional subcategories, the menu module 116 is executable by the processor 104 to cause the GUI to display an additional menu including the one or more additional subcategories. For example, the menu module 116 can be executable by the processor 104 to cause the GUI 202 to display a menu 212, illustrated in FIG. 2C, in response to a signal received from the remote control 128 indicating a selection of the "Audio" subcategory in the menu 208 illustrated in FIG. 2B.

Figure 2B:
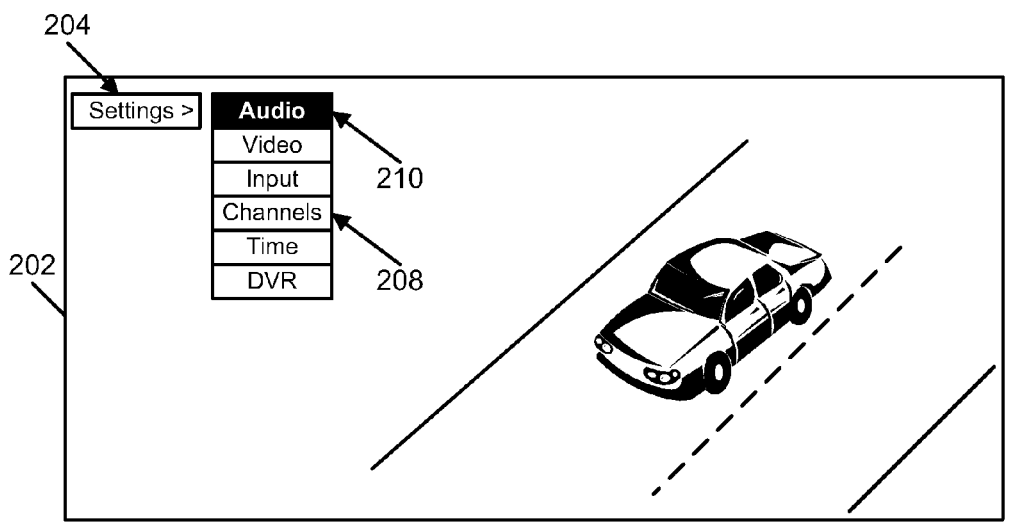
Figure 2C:
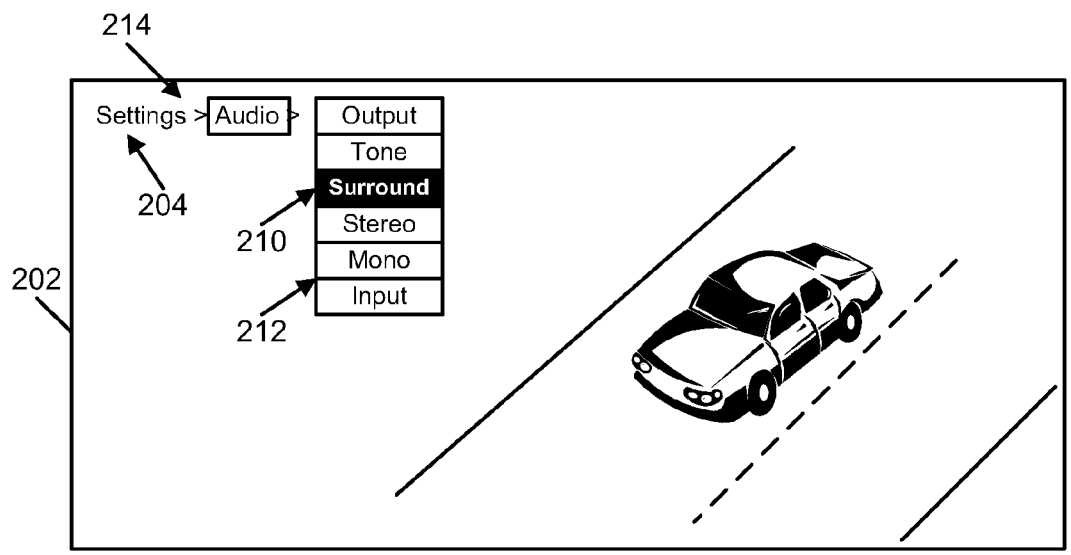

In one embodiment, each menu, such as the menus 208 and 212, can be a dial menu, in which moving a selector element, such as the highlight bar 210 illustrated in FIGS. 2B and 2C, in one direction causes the subcategories to "wrap around," such that a first subcategory is displayed after a last subcategory by the menu without reversing a direction of the selector element.

In an illustrative embodiment, the menu module 116 can be executable by the processor 104 to cause a menu to automatically become navigable via one or more directional keys at the remote control device 128 when the menu is displayed. For instance, the menu module 116 can be executable by the processor 104 to provide a menu highlight bar 210 or other selector element to visually move within the GUI in response to a signal from the remote control device 128 indicating a selection of a directional key, such as an arrow key, a volume up key, a volume down key, a channel up key, a channel down key, a page up key, a page down key, or another directional key. A selection of a subcategory from a menu can be indicated by selection of a confirmation key at the remote control 128 while a subcategory is highlighted by the menu highlight bar 210.

The stored content module 110 is executable by the processor 104 to cause the GUI to display content related to a selected subcategory that is not associated with any additional subcategories that are children of the selected subcategory. For instance, the stored content module 110 can be executable by the processor 104 to cause the content 216 illustrated in FIGS. 2D and 2E to be displayed at the television 124, in response to a selection of a "Speakers" subcategory, which has no child subcategories of its own.

Figure 2D:
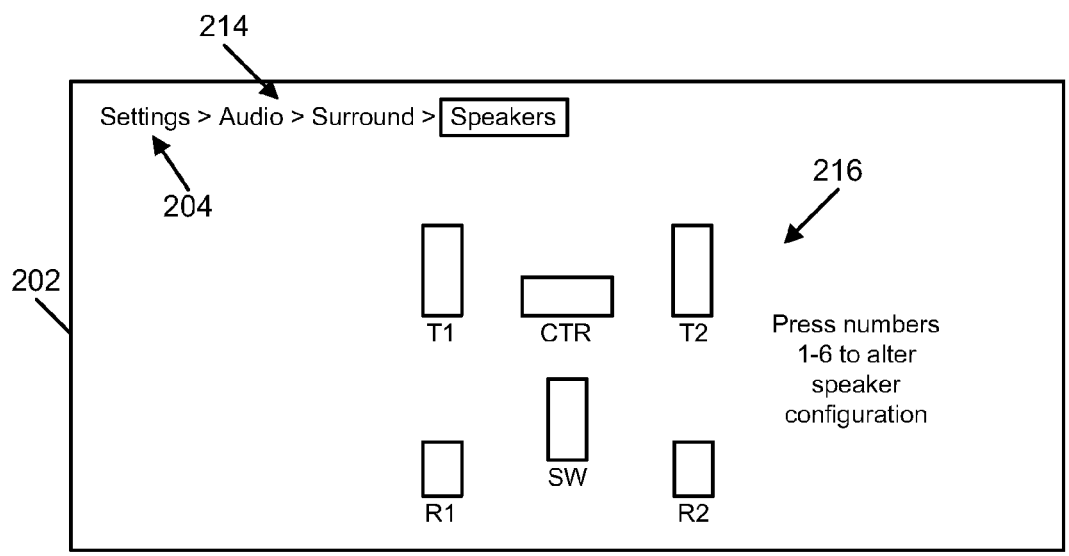

Further, the memory 106 includes a bread crumb module 118 that is executable by the processor 104 to cause the GUI to display and update a bread crumb trail within the GUI. The bread crumb trail visually illustrates a user's navigation from the initial category to a current subcategory. The bread crumb trail includes a visual representation of the initial category, and can be updated to include one or more other categories, such as selected subcategories. For instance, as shown in 2C, the bread crumb trail 214 includes the "Settings" category 204 and an "Audio" subcategory selected from the menu 208 in FIG. 2B. In another example, as shown in FIG. 2D, the bread crumb trail 214 can include additional subcategories "Surround" and "Speakers" that are selected from additional menus. In one embodiment, the bread crumb trail can include a hierarchy of character strings displayed linearly.

Figure 2E:
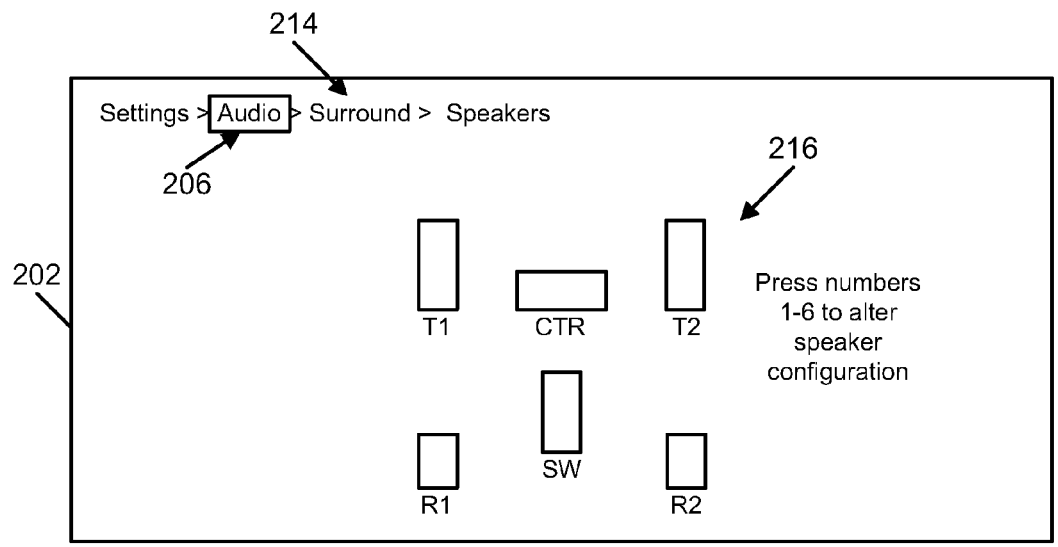
Figure 2F:
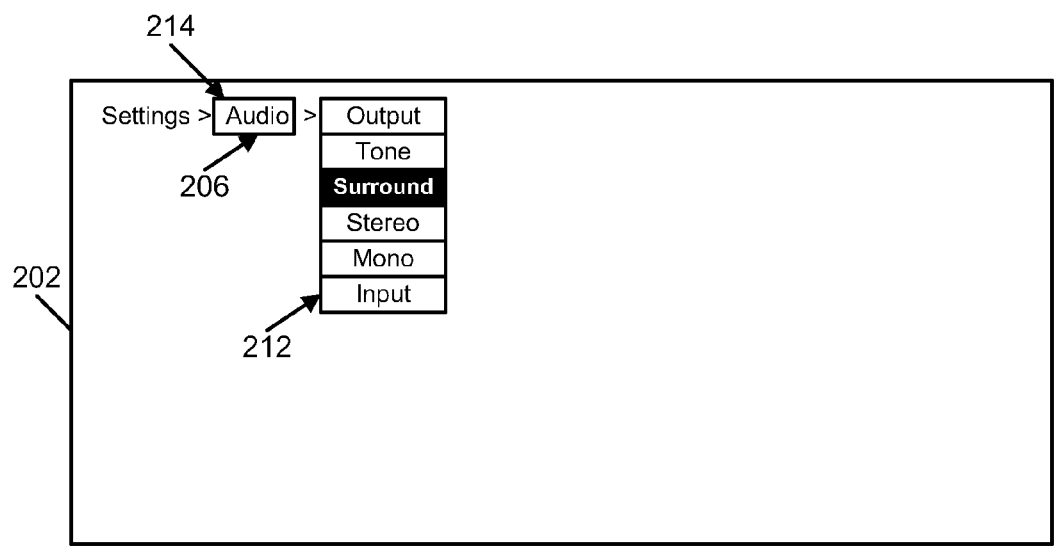

The bread crumb module 118 is executable by the processor 104 to determine whether the set-top box device 102 has received a signal from the remote control 128 indicating a selection of a bread crumb from the bread crumb trail within the GUI. The menu module 116 is executable by the processor 104 to cause the GUI to display a menu of one or more peer subcategories associated with the selected bread crumb. For instance, the menu module 116 can be executable by the processor 104 to cause the GUI 202 to display the menu 212 in response to a selection of the "Audio" category from the bread crumb trail 214, as illustrated in FIGS. 2E and 2F. In the embodiment illustrated in FIG. 2F, the category selected from the bread crumb trail ("Surround") becomes automatically associated with a highlight bar or other selector element in the menu 212 when the menu 212 is displayed.

In addition, the bread crumb module 118 is executable by the processor 104 to update the bread crumb trail 214 in response to a selection of a category or subcategory in the bread crumb trail 214; a selection of a subcategory from a menu of subcategories associated with the selected category or subcategory; or any combination thereof. For example, the updated bread crumb trail can include a peer category related to the category selected from the bread crumb trail 214 and can no longer include the selected category. In a particular embodiment, as illustrated in FIG. 2F, content 216 can cease to be displayed after selection of a bread crumb element other than the bread crumb element associated with the content 216.

In an illustrative embodiment, the bread crumb module 118 can be executable by the processor 104 to cause a trail highlight bar 206, illustrated in FIGS. 2E and 2F, or another selector element to move within the GUI 202 in response to a signal from the remote control device 128 indicating a selection of a directional key, such as an arrow key, a volume up key, a volume down key, a channel up key, a channel down key, a page up key, a page down key, or another directional key. A selection of a category or subcategory from the bread crumb trail can be indicated by selection of a confirmation key at the remote control 128 while the category or subcategory is highlighted by the trail highlight bar 206.

Figure 3:
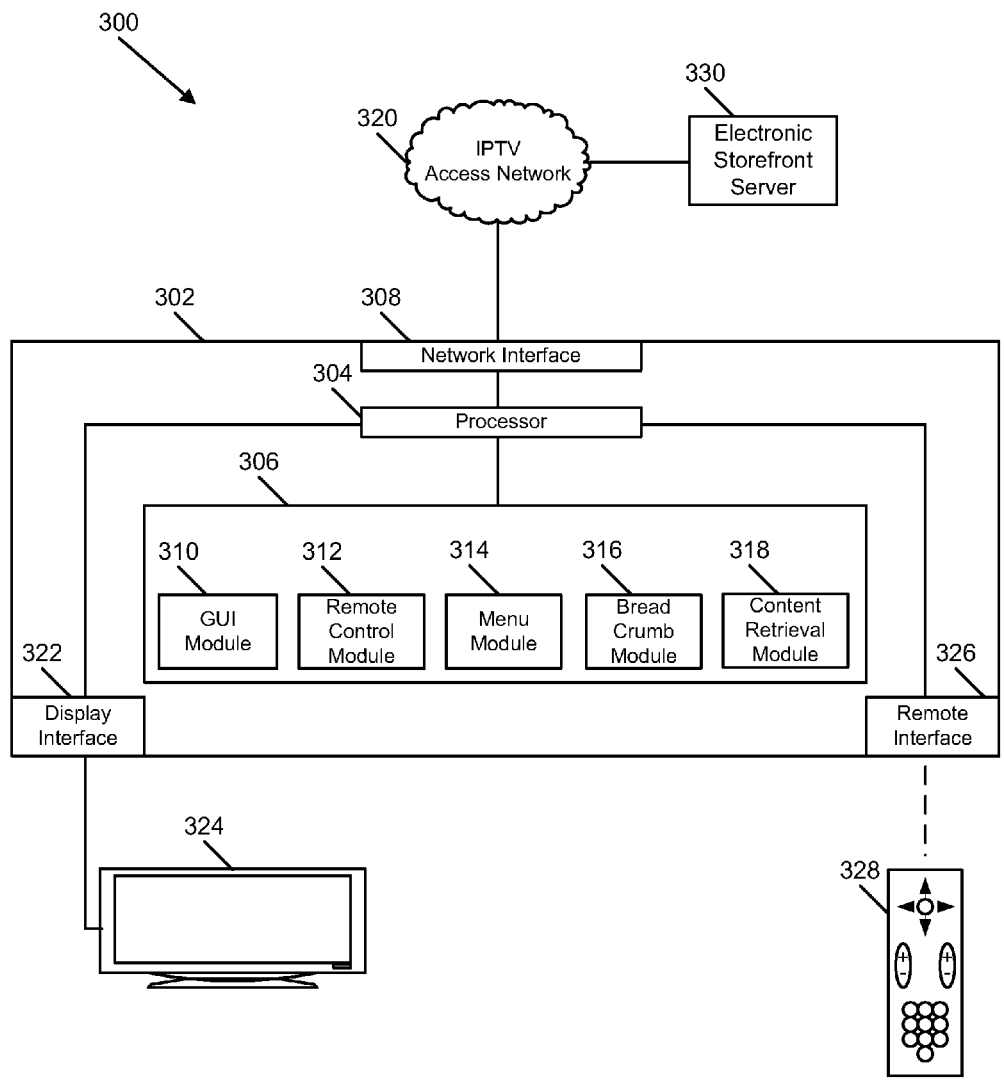
FIG. 3 is a block diagram illustrating another particular embodiment of a system to provide a navigation interface.

FIG. 3 illustrates another particular embodiment of a system to provide a navigation interface. The system 300 includes a set-top box device 302 having a processor 304 and memory 306 accessible to the processor 304. The set-top box device 302 can also include a network interface 308 adapted to facilitate communication between the set-top box device 302 and a private access network, such as an IPTV access network 320 or other video distribution, triple-play or quad-play network. In one embodiment, the set-top box device 102 can communicate with an e-commerce server, such as the electronic storefront server 330 via the IPTV access network 320. In addition, the set-top box device 302 includes a display interface 322 adapted to facilitate communication between the set-top box device 302 and a display device coupled to the set-top box device 302, such as the television 324. Further, the set-top box device 302 includes a remote interface 326 adapted to facilitate communication between the set-top box device 302 and a remote control device associated with the set-top box device 302, the television 324, or a combination thereof.

The memory 306 includes a plurality of modules 310-318. The modules 310-318 can include computer instructions that are readable and executable by the processing logic 304 to implement various functions of the set-top box device 302 with respect to providing a navigation interface. For example, the modules 310-318 can represent various aspects of one or more software applications, operating systems, or other computer programs. In other embodiments, the modules 310-318 can be implemented as hardware logic or a combination of hardware logic and computer instructions.

Figure 4A:
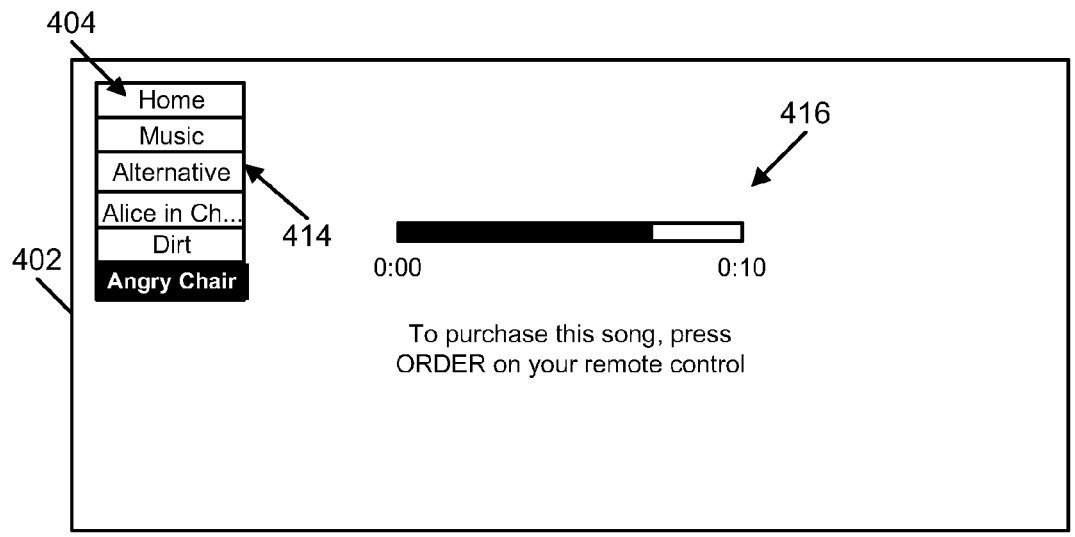
FIGS. 4A and 4B illustrate aspects of another illustrative embodiment of a navigation interface.

The memory 306 includes a GUI module 310 that is executable by the processor 304 to provide, at the television 324, a graphical user interface (GUI) related to an electronic storefront (or another e-commerce site or source of content accessible via the IPTV access network 320), in response to a request to interact with the electronic storefront. In an illustrative embodiment, the GUI can include a selectable icon or text indicating an initial category. For instance, in response to a signal received from the remote control 328 indicating a selection of a "Store" key or other key adapted or programmed to indicate a request to interact with the electronic storefront, the GUI module 310 can be executable by the processor 304 to provide a GUI 402, as illustrated in FIG. 4A. The GUI 402 can initially include text 404 referencing an initial category, such as a "Home" category 404.

The memory 306 includes a remote control module 312 that is executable by the processor 304 to process signals received from the remote control 328. Such signals can include a signal indicating a selection of a confirmation key at the remote control 328; a signal indicating a selection of a directional key at the remote control 328; a signal indicating a selection of a functional key at the remote control 328; or a combination thereof. For example, the remote control module 312 can be executable by the processor 304 to process a signal indicating a selection of a confirmation key at the remote control 328, such as an "OK" key, an "Enter" key, a "Select" key, or another confirmation key, while the "Home" category 404 is highlighted or otherwise active within the GUI 402 illustrated in FIG. 4A.

The memory 306 includes a menu module 314 that is executable by the processor 304 to cause the GUI to display, in response to the signal indicating selection of the initial category, a menu having selectable peer subcategories that are each children of the initial category. For instance, the menu module 314 can be executable by the processor 304 to cause the GUI 402 to display a menu that includes selectable subcategories of the initial "Home" category 404, such as categories of products, services, media, other items, or any combination thereof.

In addition, the menu module 314 is executable by the processor 304 to determine, in response to a signal received from the remote control 328 indicating a selection of a subcategory in a menu, whether the selected subcategory is associated with one or more additional subcategories that are children of the selected subcategory. If the selected subcategory is associated with one or more additional subcategories, the menu module 314 is executable by the processor 304 to cause the GUI to display an additional menu including the one or more additional subcategories.

Figure 4B:
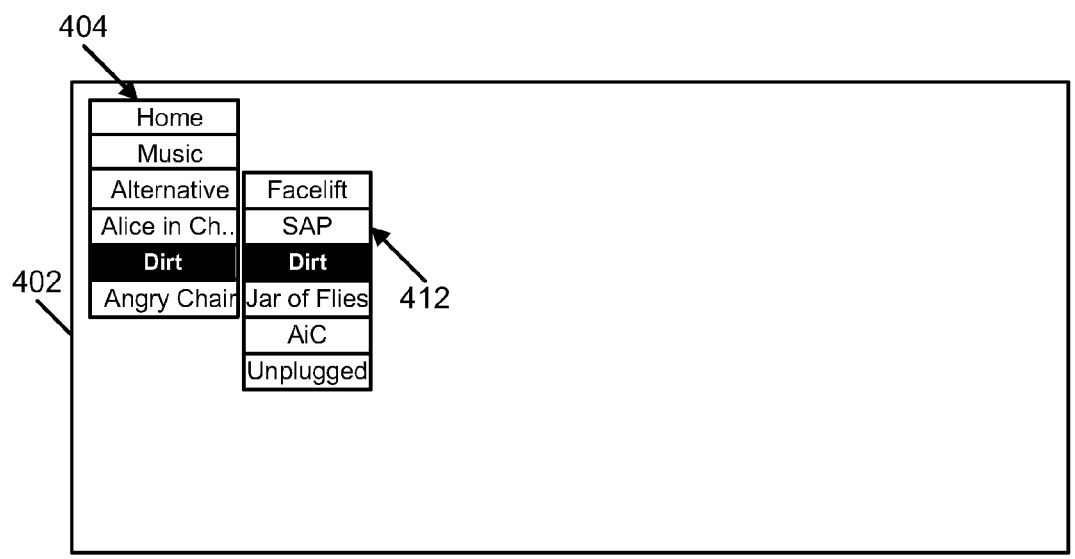

Further, the memory 306 includes a bread crumb module 316 that is executable by the processor 304 to cause the GUI to display and update a bread crumb trail within the GUI. In one example, as shown in 4A, the bread crumb trail 414 can be in a menu format and includes the "Home" category 404 and one or more other categories, such as one or more subcategories selected from various other menus. The bread crumb module 316 is executable by the processor 304 to determine whether the set-top box device 302 has received a signal from the remote control 328 indicating a selection of a bread crumb from the bread crumb trail within the GUI. The menu module 314 is executable by the processor 304 to cause the GUI to display a menu of peer subcategories associated with the selected bread crumb. For instance, the menu module 314 can be executable by the processor 304 to cause the GUI 402 to display the menu 412 in response to a selection of the "Dirt" category from the bread crumb trail 414, as illustrated in FIG. 4B. In the embodiment illustrated in FIG. 4B, the category selected from the bread crumb trail becomes automatically associated with a highlight bar or other selector element in the menu 412 when the menu 412 is displayed.

In addition, the bread crumb module 316 is executable by the processor 304 to update the bread crumb trail in response to a selection of a category or subcategory in the bread crumb trail; a selection of a subcategory from a menu of subcategories associated with the selected category or subcategory; or any combination thereof. For example, the updated bread crumb trail can include a peer category related to the category selected from the bread crumb trail 414 and can no longer include the selected category.

The memory 306 includes a content retrieval module 318 that is executable by the processor 304 to retrieve from the electronic storefront server 330 content related to a subcategory selected via the electronic storefront GUI, which is not associated with any additional subcategories that are children of the selected subcategory. For instance, the stored content module 310 can be executable by the processor 304 to cause the content 416 illustrated in FIG. 4A to be displayed at the television 324, in response to a selection of an "Angry Chair" subcategory, where "Angry Chair" indicates a media selection and has no child subcategories of its own. Content retrieved via the content retrieval module 318 can include, for example, video game content, video game session content, electronic program guide information, content related to a purchasable product, content related to purchasable video content, content related to purchasable audio content, other content, or any combination thereof.

Figure 5:
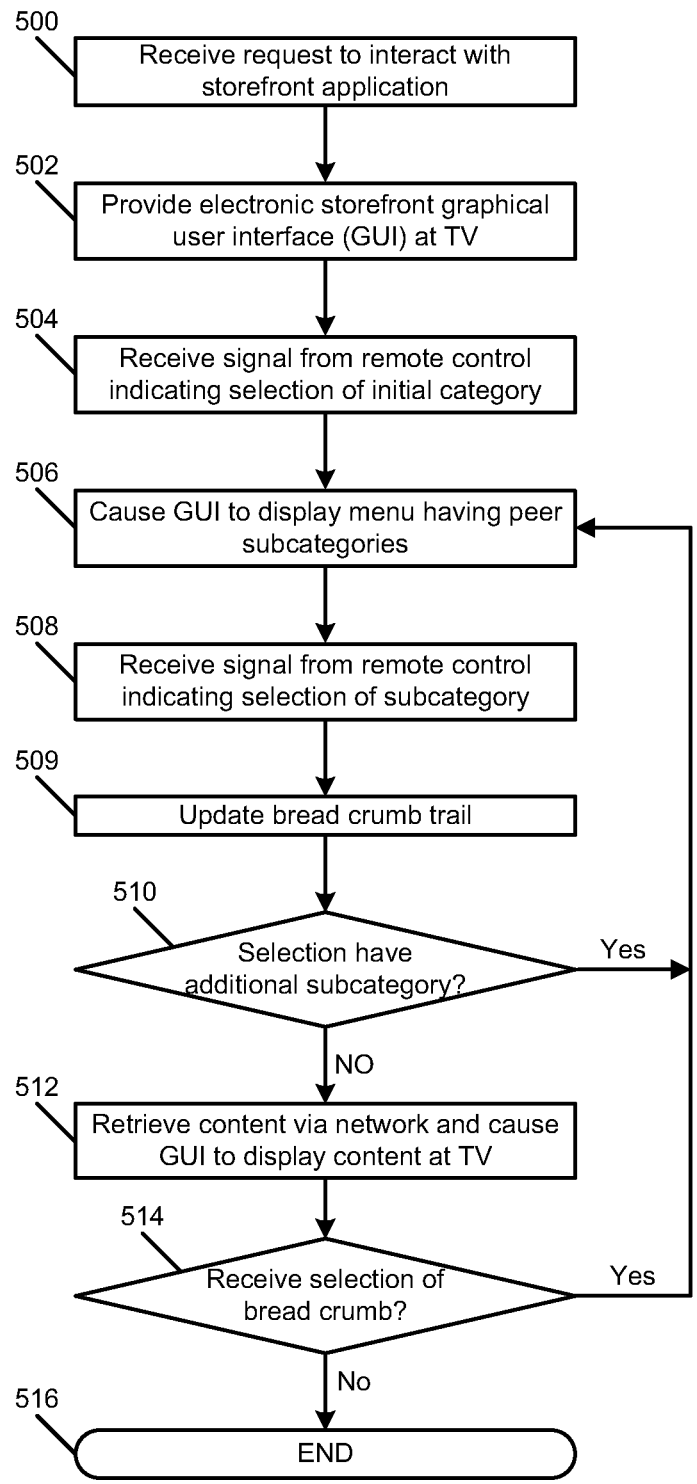
FIG. 5 is a flow diagram illustrating a particular embodiment of a navigation method.

FIG. 5 illustrates a particular embodiment of a navigation method. At block 500, a set-top box device receives a request to interact with an electronic storefront, another ecommerce site, or another source of content accessible via a network. Moving to block 502, the set-top box device provides an electronic storefront graphical user interface (GUI) at a television coupled to the set-top box device. In an illustrative embodiment, the GUI can include a selectable icon or text indicating an initial category. Proceeding to block 504, the set-top box device receives a signal from a remote control associated with the set-top box device, the television, or a combination thereof, the signal indicating a selection of the initial category. For example, the set-top box device can receive a signal from the remote control indicating a selection of a confirmation key (such as an OK key, enter key, select key, programmed key, or other key) while the initial category is highlighted or otherwise indicated as active within the GUI.

Continuing to block 506, the set-top box device causes the GUI to display a menu having peer subcategories that are each children of the initial category. In one embodiment, the menu can be a dial menu in which moving in one direction causes the subcategories to "wrap around," such that the first subcategory is accessible after the last subcategory without reversing directions. Advancing to block 508, the set-top box device receives a signal from the remote control indicating selection of a subcategory. The signal can indicate selection of an arrow key or other directional key at the remote control to move a cursor, highlight bar, or other selector element to a desired subcategory, as well as selection of a confirmation key.

At block 509, the set-top box device causes the GUI to update a bread crumb trail within the GUI. Moving to decision node 510, the set-top box device determines whether the selected subcategory is associated with one or more additional subcategories that are children of the selected subcategory. If the selected subcategory is associated with one or more additional subcategories, the method can return to block 506 and continue until a subcategory is selected that does not include additional subcategories, such as a particular product, particular media, or other item available via the electronic storefront. If the selected subcategory does not include additional subcategory, the method proceeds to block 512, and the set-top box device retrieves content associated with the selected subcategory, such as the product, media or other item, and causes the GUI to display the content at the television. Continuing to block 514, the set-top box device determines whether it has received a selection of a bread crumb from the bread crumb trail within the GUI. If so, the method returns to block 506, and the set-top box device causes the GUI to display a menu of peer subcategories associated with the selected bread crumb. When a subcategory is selected, the bread crumb trail is updated, and the method continues. The method terminates at 516.

Figure 6:
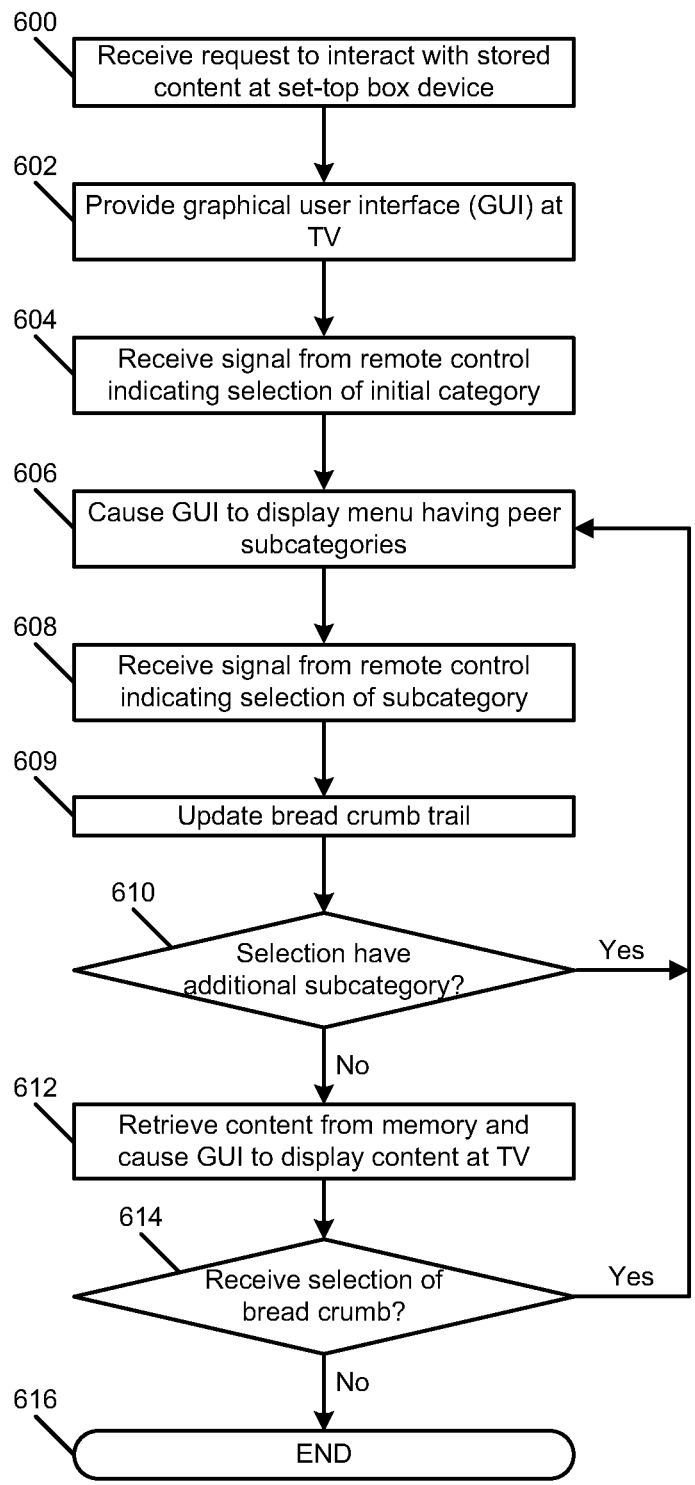
FIG. 6 is a flow diagram illustrating another particular embodiment of a navigation method.

FIG. 6 illustrates another particular embodiment of a navigation method. At block 600, a set-top box device receives a request to interact with content stored at the set-top box device, such as settings information, electronic program guide information, or other stored content. Moving to block 602, the set-top box device provides a graphical user interface (GUI) related to the stored content at a television coupled to the set-top box device. In an illustrative embodiment, the GUI can include a selectable icon or text indicating an initial category.

Proceeding to block 604, the set-top box device receives a signal from a remote control associated with the set-top box device, the television, or a combination thereof, the signal indicating a selection of the initial category. Continuing to block 606, the set-top box device causes the GUI to display a menu having peer subcategories that are each children of the initial category. Advancing to block 608, the set-top box device receives a signal from the remote control indicating selection of a subcategory.

At block 609, the set-top box device causes the GUI to update a bread crumb trail within the GUI. Moving to decision node 610, the set-top box device determines whether the selected subcategory is associated with one or more additional subcategories that are children of the selected subcategory. If the selected subcategory is associated with one or more additional subcategories, the method can return to block 606 and continue until a subcategory is selected that does not include additional subcategories, such as a particular video parameter (such as brightness or contrast), another setting or another element of content stored at the set-top box device. If the selected subcategory does not include additional subcategory, the method proceeds to block 612, and the set-top box device retrieves content associated with the selected subcategory and causes the GUI to display the content at the television. Continuing to block 614, the set-top box device determines whether it has received a selection of a bread crumb from the bread crumb trail within the GUI. If so, the method returns to block 606, and the set-top box device causes the GUI to display a menu of peer subcategories associated with the selected bread crumb. When a subcategory is selected, the bread crumb trail is updated, and the method continues. The method terminates at 616.

Figure 7:
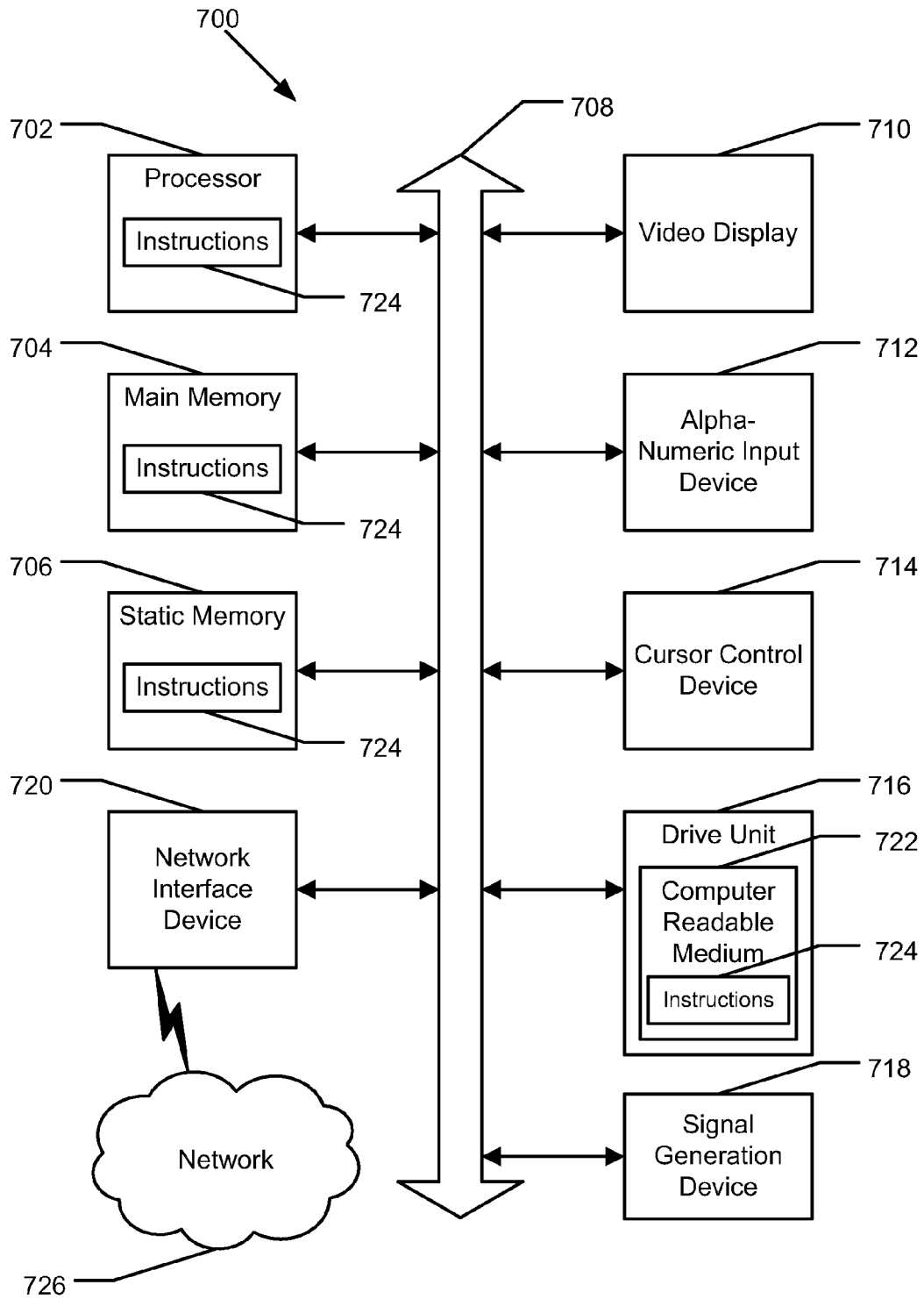
FIG. 7 is a block diagram illustrating a particular embodiment of a general computer system.

FIG. 7 shows an illustrative embodiment of a general computer 700 including a set of instructions that can be executed to cause the computer system to perform any one or more of the methods or computer based functions disclosed herein. The computer system 700 may operate as a standalone device or may be connected, such as using a network, to other computer systems or peripheral devices. In an illustrative embodiment, such standalone and peripheral devices can include, for example, set-top box devices, servers, other network elements, or any combination thereof, as illustrated in FIGS. 1 and 3.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, such as a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the claimed embodiments are not limited to such standards and protocols. For example, standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A server, comprising:
a memory to store instructions; and
a processor coupled to the memory, wherein responsive to executing instructions, the processor performs operations comprising:
providing a graphical user interface to a set-top box device that presents the graphical user interface at a display device, wherein the graphical user interface includes a visual navigation trail having a first selectable category for set top box device settings and a second selectable category for multimedia content selection, wherein the visual navigation trail represents a visual representation of a sequence of categorical selections, wherein the graphical user interface automatically becomes navigable via directional keys at a remote control device associated with one of the display device or the set-top box device when the graphical user interface is displayed, and wherein the visual navigation trail comprises a dial menu in which a first subcategory is accessible after a last category without reversing directions;
receiving a signal at the processor responsive to user input at the remote control device, wherein the signal indicates a selection of the second selectable category for multimedia content selection;
adjusting the graphical user interface based on the signal to generate an adjusted graphical user interface that adds a peer category of multimedia items to the dial menu of the adjusted graphical user interface, wherein the multimedia items of the peer category are related to the second selectable category of the visual navigation trail according to a person that is associated with each of the multimedia items of the peer category and the second selectable category of the visual navigation trail, wherein the dial menu is navigable via directional key signals originated from the remote control device when the dial menu is displayed;
providing the adjusted graphical user interface to the set top box for presentation at the display device;

adjusting the graphical user interface as an adjusted graphical user interface based on an additional user input to return to the visual navigation trail, while still displaying only the second selectable category of the peer category of multimedia items previously selected by the user; and providing the adjusted graphical user interface based on the additional user input to the set top box for presentation at the display device.

2. The server of claim 1, wherein the multimedia items comprise purchasable video content that is identified by title.

3. The server of claim 1, wherein the second selectable category identifies a source of content, wherein the multimedia items include video content that is accessible from the source of content, and wherein the multimedia items are represented by text keys that are individually highlighted based on navigation via the directional key signals from the remote control device.

4. The server of claim 1, wherein the multimedia items are represented by text keys that are individually highlighted based on navigation via the directional key signals from the remote control device, and wherein the text keys are displayed in multiple adjacent linear groupings.

5. The server of claim 1, wherein the directional key signals are based on user input at the remote control device using arrow keys, channel keys, volume keys, page keys, or any combination thereof, and wherein the person is a musical band or a musician.

6. The server of claim 1, wherein the operations further comprise:
causing the graphical user interface to provide a selector in association with a category in the visual navigation trail;
receiving another signal at the processor responsive to a selection of a directional key at the remote control device; and
causing the graphical user interface to visually move the selector to a next category or a previous category in the visual navigation trail in response to the another signal.

7. The server of claim 1, wherein the operations further comprise determining whether a selectable category, comprising the first selectable category and the second selectable category, is associated with additional subcategories that are children of a selected subcategory, and wherein responsive to the selected subcategory being associated with the additional subcategories, continuing to receive the signal wherein the signal identifies other selections.

8. The server of claim 1, wherein the visual navigation trail is further displayed utilizing one of a trail menu or a linear hierarchy of character strings.

9. The server of claim 1, wherein the adjusted graphical user interface presents content related to a target multimedia item of the multimedia items responsive to a target text key corresponding to the target multimedia item being highlighted via the directional key signals.

10. The server of claim 9, wherein the target multimedia item comprises video content, and wherein the adjusted graphical user interface presents an option to purchase the target multimedia item responsive to the target text key being highlighted.

11. The server of claim 1, wherein the second selectable category identifies an entity that provides access to purchasable video content related to the person.

12. A communication device, comprising:
a memory to store instructions; and
a processor coupled to the memory, wherein responsive to executing the instructions, the processor performs operations comprising:

providing a graphical user interface at a display coupled to the communication device, wherein the graphical user interface includes a visual navigation trail having a first selectable category and a second selectable category;
obtaining a directional input via directional keys of a remote control device associated with the communication device when the graphical user interface is displayed, and wherein the visual navigation trail comprises a dial menu in which a first subcategory is accessible after a last category without reversing directions;
receiving a signal at the communication device, wherein the signal originates from a remote control device associated with the communication device, the display, or a combination thereof, and wherein the signal indicates a selection of the second selectable category to select multimedia content selection;
causing the graphical user interface to display, in response to the signal, a dial menu including multimedia items of the second selectable category, wherein the dial menu becomes navigable via the directional keys at the remote control device when the dial menu is displayed to enable selection of one of the multimedia items for presentation;
causing the graphical user interface to display a peer category that is related to the second selectable category according to a person that is associated with the peer category and the second selectable category;
adjusting the graphical user interface as an adjusted graphical user interface based on an additional user input to return to the visual navigation trail, while still displaying only the second selectable category of the peer category previously selected by the user; and
causing the graphical user interface to display the adjusted graphical user interface based on the additional user.

13. The communication device of claim 12, wherein the operations further comprise receiving a second signal from the remote control device, the second signal indicating a selection from the peer category.

14. The communication device of claim 13, wherein the operations further comprise, in response to the selection of the peer category from the menu, changing the visual navigation trail displayed via the graphical user interface to include the peer category and to not include any subcategory of the second selectable category.

15. The communication device of claim 13, wherein the operations further comprise determining whether a selectable category, comprising the first selectable category and the second selectable category, is associated with additional subcategories that are children of a selected subcategory, and wherein responsive to the selected subcategory being associated with the additional subcategories, continuing to receive the signal wherein the signal identifies other selections.

16. The communication device of claim 12, wherein the operations further comprise displaying content related to a target multimedia item of the multimedia items responsive to a target text key corresponding to the target multimedia item being highlighted via the directional keys.

17. The communication device of claim 16, wherein the operations further comprise:
presenting an option to purchase the target multimedia item responsive to the target text key being highlighted, wherein the target multimedia item comprises video content.

18. The communication device of claim 17, wherein the target multimedia item comprises video content.

19. The communication device of claim 12, wherein multimedia content of the multimedia content selection comprises video content accessible from an entity identified by text of the second selectable category.

20. The communication device of claim 12, wherein the second selectable category identifies a source of content, wherein the multimedia items comprise video content that is accessible from the source of content, and wherein the multimedia items are represented by text keys that are individually highlighted based on navigation via the directional keys of the remote control device.

21. The communication device of claim 12, wherein the second selectable category is represented by text without providing an icon.

22. A non-transitory machine readable storage medium, comprising instructions, wherein responsive to executing the instructions, a processor performs operations comprising:

providing a graphical user interface at a display coupled to a communication device, wherein the graphical user interface includes a visual navigation trail for a plurality of selectable categories;

obtaining a directional input via a remote control device associated with the communication device when the graphical user interface is displayed, and wherein the visual navigation trail comprises a dial menu in which a first subcategory is accessible after a last category without reversing directions;

receiving a signal from the remote control device associated with the communication device or the display, the signal indicating a selection of a multimedia content selection of the plurality of selectable categories;

causing the graphical user interface to display, in response to the signal, a menu including multimedia items of the multimedia content selection, wherein the menu automatically becomes navigable via directional keys of the remote control device when the menu is displayed to enable selection of one of the multimedia items for presentation;

causing the graphical user interface to display a peer category of additional multimedia items of an adjusted graphical user interface, wherein the additional multimedia items of the peer category are related to the multimedia items of the multimedia content selection according to a person that is associated with each of the additional multimedia items of the peer category and the multimedia items of the multimedia content selection;

adjusting the graphical user interface as an adjusted graphical user interface based on an additional user input to return to the visual navigation trail, while still displaying only an other selectable category of the peer category of multimedia items previously selected by the user; and causing the graphical user interface to display the adjusted graphical user interface.

23. The non-transitory machine readable storage medium of claim 22, wherein the multimedia content selection identifies a source of content, wherein multimedia items of the multimedia content selection comprises video content, and wherein the multimedia items are represented by text keys that are individually highlighted based on navigation via the directional keys of the remote control device.

24. The non-transitory machine readable storage medium of claim 23, wherein the operations further comprise determining whether a selectable category, comprising a first selectable category and a second selectable category, is associated with additional subcategories that are children of a selected subcategory, and wherein responsive to the selected subcategory being associated with the additional subcategories, continuing to receive the signal wherein the signal identifies other selections.

* * * * *